United States Patent [19]

Yamada et al.

[11] 4,444,838

[45] Apr. 24, 1984

[54] MAGNETIC RECORDING MEDIUM

[75] Inventors: Yasuyuki Yamada; Goro Akashi; Nobuo Tsuji; Yoshito Mukaida, all of Kanagawa, Japan

[73] Assignee: Fuji Photo Film Co., Ltd., Kanagawa, Japan

[21] Appl. No.: 387,129

[22] Filed: Jun. 10, 1982

[30] Foreign Application Priority Data

Jun. 10, 1981 [JP] Japan .................................. 56-89114

[51] Int. Cl.$^3$ ................................................ G11B 5/70
[52] U.S. Cl. .................................. 428/336; 252/62.54; 360/134; 360/135; 360/136; 427/128; 428/335; 428/425.9; 428/692; 428/900; 428/492; 428/521
[58] Field of Search ............... 428/694, 692, 695, 900, 428/335, 336, 425.9, 492, 521; 252/62.54; 360/134–136; 427/128

[56] References Cited

U.S. PATENT DOCUMENTS 4,309,471 1/1982 Suzuki et al. ...................... 428/694
4,316,927 2/1982 Kimura ............................... 428/694

FOREIGN PATENT DOCUMENTS 55-139635 10/1980 Japan .................................. 428/692

*Primary Examiner*—Ellis P. Robinson
*Attorney, Agent, or Firm*—Sughrue, Mion, Zinn, Macpeak and Seas

[57] ABSTRACT

A magnetic recording medium which comprises on a support base having coated thereon a magnetic layer containing a binder and a ferromagnetic fine powder dispersed in the binder is disclosed. The binder is comprised of a cellulose derivative having a residual OH group in a proportion of 7.5 to 40%, a diolefin or olefin series synthetic rubber and a polyisocyanate compound. The medium has excellent video sensitivity and video signal to noise ratio. The medium of the invention also have improved abrasion resistance.

15 Claims, No Drawings

MAGNETIC RECORDING MEDIUM

FIELD OF THE INVENTION

The present invention relates to a magnetic recording medium and more particularly, to a binder composition having high dispersibility with respect to a ferromagnetic fine powder and excellent abrasion resistance.

BACKGROUND OF THE INVENTION

Examples of useful conventional binders for magnetic coatings containing ferromagnetic powders include cellulose derivatives, vinyl chloride-vinyl acetate copolymers, polyurethane resins, acryl series resins and acryl copolymers, polyvinylidene chloride and vinylidene chloride copolymers, synthetic rubbers and polyesters, as disclosed in, for example, U.S. Pat. Nos. 4,172,176, 3,597,273, 3,216,846, 3,150,995, 4,049,871, 4,152,484, 4,115,290, 3,149,995, 3,926,826 and 4,020,227. There binders have been employed individually or in the form of a mixture of two or more thereof.

However, sufficient dispersibility, surface properties and abrasion resistance required for magnetic recording media have not been achieved with these conventional binders.

SUMMARY OF THE INVENTION

An object of the present invention is to improve on conventional binders and provide a novel binder composition which does not have the above-described defects inherent in conventional binders.

Another object of the present invention is to provide a novel magnetic recording medium which has:
(a) excellent surface properties,
(b) a magnetic layer possessing high dispersibility with respect to a magnetic substance and exhibiting excellent B-H characteristic,
(c) a magnetic layer having excellent durability (the development of drop out due to abrasive peeling is reduced to a great extent)
(d) a magnetic layer with a greatly reduced tendency to deteriorate with the passage of time,
(e) reduced dependence on temperature and humidity,
(f) excellent adhesion power between the support and the magnetic layer,
(g) a magnetic layer causing a reduced weight loss due to abrasion with the magnetic head,
(h) a small kinetic coefficient of friction, and
(i) an excellent signal to noise ratio.

As a result of examining cellulose derivatives (which are previously used as one component of binders for magnetic tapes), it has now been found that abrasion resistance of a magnetic tape, particularly under the atmosphere of high temperature and high humidity, can be greatly improved by employing synthetic rubbers which are capable of exerting a plasticizing effect on cellulose derivatives. Therefore, they have been used in places of conventionally used thermoplastic polyurethane resins.

The present invention is a magnetic recording medium comprising a support having coated thereon a magnetic layer containing a ferromagnetic powder dispersed in a binder, the binder being comprised of a cellulose derivative having residual OH groups in a proportion of 7.5 to 40%, a diolefin or olefin series synthetic rubber and a polyisocyanate compound.

DETAILED DESCRIPTION OF THE INVENTION

Cellulose derivatives having 7.5 to 40% of residual OH groups which can be employed in the present invention include nitrocellulose, cellulose acetate butyrate, cellulose propionate and the like. Particularly preferred cellulose derivatives are those having 15 to 39%, most preferably 20 to 37%, of residual OH groups, and, of these cellulose derivatives, nitrocellulose is most preferred.

The above-described cellulose derivatives are those having a mean polymerization degree of 50 to 800, preferably 80 to 500. As the proportion of residual OH groups is increased, abrasion resistance decreases and, also, the compatibility of such a cellulose derivative with a synthetic rubber decreases. On the other hand, as the proportion of residual OH group is decreased, dispersibility with respect to a magnetic substance and abrasion resistance of a magnetic tape obtained are gradually lowered and its production cost is increased. Taking into account these factors, the proportion of residual OH groups is restricted to a range of 7.5% to 40%.

Diolefin or olefin series synthetic rubbers which can be employed in the present invention include butadiene rubbers, synthetic isoprene rubbers, chloroprene rubbers, acrylate-butadiene rubbers, isobutene-isoprene rubbers, nitrile-butadiene rubbers, nitrile-chloroprene rubbers, pyridine-chloroprene rubbers, styrene-butadiene rubbers, styrene-chloroprene rubbers, styrene-isoprene rubbers, ethylene-propylene rubbers, ethylene-1-butene rubbers and the like. Preferred synthetic rubbers include butadiene rubbers, nitrile-butadiene rubbers and styrene-butadiene rubbers.

It may not be necessary for these synthetic rubbers to receive any particular modification treatments. However, in order to improve their affinity to magnetic substances and dispersibility with respect to magnetic substances and to increase the cross-linking effect of the cross-linking agent used, it is preferable that these synthetic rubbers have been subjected to certain modification treatments.

Such modification can be achieved by introducing polar groups into a rubber molecule through copolymerization of constituent monomers in the presence of an appropriate amount of vinyl compound having a polar group or polar groups.

Polar group-containing vinyl compounds include acrylic acid, methacrylic acid, hydroxyethylacrylate (or methacrylate), maleic acid (or its anhydride), fumaric acid, itaconic acid, vinylpyridine, vinylpyrrolidone, N,N-dimethylaminoethylacrylate (or methacrylate), vinylbenzenesulfonic acid, acryloyl (or methacryloyl) ethyl phosphate and the like. These compounds are added in an amount of 0.1 to 10%, preferably 1 to 5%, based on whole starting monomers.

The cellulose derivative and synthetic rubber which are used as binder components of the present invention are preferably employed in a mixing ratio of the former to the latter ranging from 50/50 to 99/1, preferably from 70/30 to 95/5. In addition, a polyisocyanate compound to be used in combination with the above-described two binder components is preferably incorporated in a binder composition in an amount of 5 to 60 parts by weight per 100 parts by weight of the mixture of both binder components.

A suitable proportion of the above-described binder composition of the present invention and a ferromagnetic powder is such that 8 to 100 parts by weight, preferably 10 to 80 parts by weight, more preferably 13 to 50 parts by weight, of the binder composition is used per 100 parts by weight of the ferromagnetic powder.

Polyisocyanates which can be employed in the present invention include aliphatic, alicyclic and aromatic di-, tri- and tetra-isocyanates having two or more of isocyanate groups within the molecule, with specific examples including ethanediisocyanate, butanediisocyanate, hexanediisocyanate, 2,2-dimethylpentanediisocyanate, 2,2,4-trimethyl-pentanediisocyanate, decanediisocyanate, ω,ω'-diisocyanate-1,3-dimethylbenzole, ω,ω'-diisocyanate-1,2-dimethylcyclohexane, ω,ω'-diisocyanate-1,4-diethylbenzole, ω,ω'-diisocyanate-1,5-dimethylnaphthalene, ω,ω'-diisocyanate-n-biphenyl, 1,3-phenylenediisocyanate, 1-methylbenzole-2,4-diisocyanate, 1,3-dimethylbenzole-2,6-diisocyanate, naphthalenediisocyanate, 1,1'-dinaphthyl-2,2'-diisocyanate, biphenyl-2,4'-diisocyanate, 3,3'-dimethylbiphenyl-4,4'-diisocyanate, diphenylmethane-4,4'-diisocyanate, 2,2'-dimethyldiphenylmethane-4,4'-diisocyanate, 3,3'-dimethoxydiphenylmethane-4,4'-diisocyanate, 4,4'-diethoxydiphenylmethane-4,4'-diisocyanate, 1-methylbenzole-2,4,6-triisocyanate, 1,3,5-trimethylbenzole-2,4,6-triisocyanate, diphenylmethane-2,4,4'-triisocyanate, triphenylmethane-4,4',4''-triisocyanate, tolylenediisocyanate, 1,5-naphthylenediisocyanate and like isocyanates; dimers or trimers of these isocyanates; and addition products of these isocyanates with dihydric or trihydric alcohols. Such addition products are e.g., those obtained by the addition reaction of trimethylolpropane with tolylenediisocyanate, hexamethylenediisocyanate or the like.

Ferromagnetic fine powders which are dispersed in binders as well as solvents and other additives such as dispersing agents, lubricants, abrasives, antistatic agents and the like can be those conventionally used for magnetic coating compositions. Also, non-magnetic support bases on which the magnetic layer is positioned can be those conventionally used.

In the present invention, the term magnetic layer refers to a layer obtained by coating on a non-magnetic support a magnetic coating composition. The composition is prepared by kneading and dispersing ferromagnetic powder, the above-described binder composition, additives and so on in a solvent. After orienting and drying the composition on the support, it forms a coating type magnetic layer.

A suitable dry thickness of the magnetic layer is 1 to 18 μm. In the case of the magnetic recording medium for digital recording reproduction where a protecting layer is provided, the dry thickness of the magnetic layer can be increased up to about 30 μm. When the magnetic layer takes a multilayer form, the sum of the thickness of individual layers may be within the above-described range. The suitable dry thickness for the magnetic layer is determined depending on the use of the magnetic recording medium prepared, the form employed (e.g., a film, a tape, a sheet, a disc, a card, a drum, etc.), the standard employed and so on.

Other matters regarding the magnetic recording medium of the present invention (e.g., a composition of its magnetic layer, additives, a support, etc.) can follow conventionally known techniques, e.g., that which described in U.S. Pat. No. 4,135,016.

The magnetic recording media prepared in accordance with the above-described embodiments of the present invention can aquire the following effects:
(i) excellent abrasion resistance under high temperature and high humidity,
(ii) only slight aggregation occurs in the magnetic coating, i.e., high storage stability (long pot life) is attained;
(iii) improved dispersibility with respect to magnetic powders and an excellent squareness ratio are achieved in the magnetic layer;
(iv) spontaneous combustion does not occur in the course of preparation;
(v) a high modulus of elasticity and
(vi) a reduced kinetic coefficient of friction thus insuring stable tape-running.

Due to these improved characteristics, the magnetic media obtained are especially well suited for video cassette tapes. Furthermore, the magnetic recording media obtained can be applied to audio tapes, magnetic sheets and degital tapes.

The present invention will now be illustrated in more detail by reference to the following examples and comparative examples. In the following examples and comparative examples, all parts are by weight unless otherwise indicated.

EXAMPLE 1

| Magnetic Coating Composition I | | |
|---|---|---|
| (A) | γ-Fe$_2$O$_3$ | 300 parts |
| | Coercive Force (Hc); 450 Oe | |
| | Particle size; 0.6 × 0.07 × 0.07 μm | |
| (B) | Nitrocellulose | 56 parts |
| | Rate of residual —OH; 30% | |
| | Degree of polymerization; 250 | |
| (C) | Synthetic Rubber (Acrylonitrile-butadiene Rubber) | 13 parts |
| | Weight ratio; 30:70 | |
| | Mean molecular weight; 300,000 | |
| (D) | Conductive Carbon Black (Average grain size: 30 mμm) | 20 parts |
| (E) | Oleic Acid | 3 parts |
| (F) | Lecithin | 3 parts |
| (G) | Methyl Ethyl Ketone-Toluene Mixed Solvent (Mixing weight ratio; 1/1) | 700 parts |

The above-described composition was place in a ball mill, and kneaded and dispersed thoroughly. To the dispersion, (H) 7 parts of a 75 wt% ethyl acetate solution of a trifunctional polyisocyanate compound produced by the addition reaction of 3 moles of toluenediisocyanate and 1 mole of trimethylolpropane (Desmodur L-75, made by Bayer A. G.) and 200 parts of methyl ethyl ketone-toluene mixed solvent having the above-described mixing ratio were added and thoroughly mixed to obtain Magnetic Coating Composition I. This Magnetic Coating Composition I was coated on a 15 μm-thick polyester support in a dry thickness of 5 μm.

The resulting wide magnetic web was then slit into magnetic tapes of a width of ½ inch. Thus obtained magnetic tape was identified Sample No. 1.

Magnetic tapes of a width of ½ inch were prepared in the same manner as in Sample No. 1 except for using Magnetic Coating Compositions II, III, IV and V, respectively, instead of the above-described Magnetic Coating Composition I, and were identified Sample Nos. 2,3,4 and 5, respectively. In the Magnetic Coating Compositions II, III, IV and V, the material and the addition amount of the ferromagnetic fine powder (A), those of the cellulose derivative (B), those of the synthetic rubber (C) and those of the polyisocyanate compound (H) in the Magnetic Coating Composition I were so changed as shown in Table 1.

COMPARATIVE EXAMPLE 1

Magnetic tapes of a width of ½ inch were prepared in the same manner as in Samples No. 1 to No. 5, respectively. However, changes were made with respect to the binder component (B) and the synthetic rubber (C) in the Magnetic Coating Compositions I to V, respectively, as shown in Table 2. This was done in order to

TABLE 1

| Sample No. | Magnetic Coating Composition | (A) Ferromagnetic Fine Powder (Amount Added) | (B) Cellulose Derivative (Amount Added) | (C) Synthetic Rubber (Amount Added) | (D) Polyisocyanate Compound (Amount Added) |
|---|---|---|---|---|---|
| 2 | II | Fe—Co alloy fine powder 90:10 (atomic ratio) Coercive force = 600 Oe Mean particle size = 40 milli μm (300 parts) | Cellulose acetate propionate (Residual —OH: 18%) Polymerization degree = 220 (51 parts) | Carboxyl modified nitrile rubber Acrylonitrile-butadiene-acrylic acid copolymer (27:70:3 wt. %) Mean molecular weight = 230,000 (8 parts) | Desmodur L-75 (14 parts) |
| 3 | III | Co-containing $FeO_x$ x = 1.42, Co content = 1.5 atomic %, Coercive force = 620 Oe, Particle size = 0.5 × 0.06 × 0.06 (μm) (300 parts) | Cellulose acetate butyrate (Residual —OH: 15%) Polymerization degree = 340 (50 parts) | Carboxyl modified SBR Styrene-butadiene-acrylic acid copolymer (23.5:73.5:3 wt. %) Mean molecular weight = 200,000 (17 parts) | Desmodur L-75 (6 parts) |
| 4 | IV | Co-containing $\gamma$-$Fe_2O_3$ Coercive force = 580 Oe, Co content = 3.0 atomic %, Particle size = 0.4 × 0.06 × 0.06 (μm) (300 parts) | Nitrocellulose Residual —OH: 30% Polymerization degree = 250 (61 parts) | Hydroxyl modified SBR Styrene-butadiene-hydroxyethylacrylate (21:70:9 wt. %) Mean molecular weight = 250,000 (14 parts) | Addition product of 1 mole of trimethylolpropane and 3 moles of hexamethylene-diisocyanate (5 parts) |
| 5 | V | $CrO_2$ Coercive force = 550 Oe Particle size = 0.9 × 0.13 × 0.13 (μm) (300 parts) | Cellulose acetate butyrate (Residual —OH: 15%) Polymerization degree = 280 (35 parts) | Vinylpyridine modified SBR Styrene-butadiene-vinylpyridine copolymer (22:72:6 wt. %) Mean molecular weight = 200,000 (11 parts) | The same addition product as described above (24 parts) | prepare Sample Nos. C-1, C-2, C-3, C-4 and C-5, respectively.

TABLE 2

| Sample No. | Magnetic Coating Composition | Binder Component (B) (Amount Added) | Binder Component (C) (Amount Added) | Polyisocyanate Compound (H) (Amount Added) |
|---|---|---|---|---|
| C-1 | C-I | Vinyl chloride-vinyl acetate copolymer Copolymerization ratio = 87:13 (by weight) Mean polymerization degree = 450 (60 parts) | The same as in the Magnetic Coating Composition (I) (13 parts) | The same as in the Magnetic Coating Composition (I) (7 parts) |
| C-2 | C-II | 2-Chloroacrylonitrile Copolymer Mean molecular weight = 58,000 (51 parts) | The same as in the Magnetic Coating Composition (II) (8 parts) | The same as in the Magnetic Coating Composition (II) (14 parts) |
| C-3 | C-III | Nitrocellulose (Residual —OH: 18%) Polymerization degree = 220 (50 parts) | Butylene adipate, Neopentyl Adipate and Diphenyl-methanediisocyanate Series Polyurethane Mean Molecular weight = 120,000 (17 parts) | The same as in the Magnetic Coating Composition (III) (6 parts) |
| C-4 | C-IV | Vinylidene chloride-acrylonitrile Copolymer [Saran F-310, trade name, Asahi Dow Ltd.) (61 parts) | The same as in the Magnetic Coating Composition (IV) (14 parts) | The same as in the Magnetic Coating Composition (IV) (5 parts) |
| C-5 | C-V | Cellulose Acetate Butyrate (Residual —OH: 15%) Polymerization degree = 280 | Nothing | The same as in the Magnetic Coating Composition (V) |

TABLE 2-continued

| Sample No. | Magnetic Coating Composition | Binder Component (B) (Amount Added) | Binder Component (C) (Amount Added) | Polyisocyanate Compound (H) (Amount Added) |
|---|---|---|---|---|
| | | | (46 parts) | (24 parts) |

Each of ½ inch wide magnetic tapes of Sample Nos. 1, 2, 3, 4, 5, C-1, C-2, C-3, C-4 and C-5 was fitted in a VHS cassette half. Characteristics of the tapes, including video sensitivity, video signal to noise ratio and abrasion resistance were measured using a video cassette recorder (Model-8800, made by Matsushita Electric Industrial Co., Ltd.). For the purpose of comparison, the results obtained in each sample tape are shown in Table 3.

TABLE 3

| Sample No. | Video Sensitivity*1 [dB] | Video S/N*2 [dB] | Lowering in Output After 100 Times' Running (Abrasion Resistance)*3 [dB] |
|---|---|---|---|
| 1 | +2.2 | +2.1 | −0.6 |
| 2 | +1.8 | +1.2 | −0.4 |
| 3 | +1.5 | +1.5 | −0.5 |
| 4 | +0.8 | +0.9 | −0.3 |
| 5 | +1.5 | +1.1 | −0.4 |
| C-1 | ±0 | ±0 | −2.4 |
| C-2 | −0.4 | −0.1 | −2.9 |
| C-3 | −0.2 | −0.4 | −3.1 |
| C-4 | −0.3 | −0.3 | −2.1 |
| C-5 | −0.4 | −0.3 | −2.3 |

*1Video sensitivity [dB]: Relative values calculated adopting the video sensitivity of Sample No. C-1 as a comparative basis and taking it as ±0 dB.
*2Video S/N [dB]: Relative values calculated adopting the video signal to noise ration of Sample No. C-1 as a comparative basis and taking it as ±0 dB.
*3Lowering of output after 100 times' running [dB]: Lowering of output determined after 100 passes which is represented on the basis of the initial output of each sample tape [the output was determined under the atmosphere of 40° C. and 80% relative humidity (RH)].

The above results show that the magnetic tapes using the binder compositions of the present invention have excellent video sensitivity and video signal to noise ratio. In particular, Magnetic Coating Compositions I and IV using nitrocellulose as cellusose derivative provided excellent results from the standpoint of total characteristics of the tape. Additional tests were carried out to compare abrasion resistances of the magnetic layers. In these tests each of the ½ inch-wide tapes was passed 100 times from the same point to the point three minutes length apart under high temperature and humidity conditions (40° C., 80% RH). Thereafter, the output was measured and compared with its initial value.

This testing confirmed that the binder compositions of the present invention are superior to conventional binders. The comparative examples caused a lowering of output ranging from −2.1 to −3.1 dB, whereas the binder compositions of the present invention caused the lowering of output ranging from −0.3 to −0.6 dB.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising:
a support base; and
a magnetic layer positioned on the support base, the magnetic layer comprising:
ferromagnetic fine powder; and
a binder in which the fine powder is dispersed, wherein the binder comprises (a) a cellulose derivative having residual OH groups in a proportion of 7.5 to 40% and a mean polymerization degree of 50–800, (b) a diolefin or olefin series synthetic rubber capable of exerting a plasticizing effect on the cellulose derivative and (c) a polyisocyanate compound.

2. A magnetic recording medium as claimed in claim 1, wherein the cellulose derivative is selected from the group of cellulose derivatives consisting of nitrocellulose, cellulose acetate butyrate, and cellulose propionate.

3. A magnetic recording medium as claimed in claim 1, wherein the cellulose derivative is nitrocellulose.

4. A magnetic recording medium as claimed in claim 1, wherein the cellulose derivative has a mean polymerization degree of from 80 to 500.

5. A magnetic recording medium as claimed in claim 1, wherein the diolefin or olefin series synthetic rubber is selected from the group consisting of butadiene rubbers, synthetic isoprene rubbers, chloroprene rubbers, acrylate-butadiene rubbers, isobutene-isoprene rubbers, nitrile-butadiene rubbers, nitrile-chloroprene rubbers, pyridine-chloroprene rubbers, styrene-butadiene rubbers, styrene-chloroprene rubbers, styrene-isoprene rubbers, ethylene-propylene rubbers and ethylene-1-butene rubbers.

6. A magnetic recording medium as claimed in claim 1, wherein the diolefin or olefin series synthetic rubber further contains a polar group-containing vinyl compound in an amount of 0.1 to 10% by weight based on the weight of the diolefin or olefin series synthetic rubber.

7. A magnetic recording medium as claimed in claim 6, wherein the polar group-containing vinyl compound is present in an amount of 1 to 5% by weight.

8. A magnetic recording medium as claimed in claim 1, wherein the cellulose derivative and synthetic rubber are present in a mixing ratio of cellulose derivative to synthetic rubber of from 50/50 to 99/1.

9. A magnetic recording medium as claimed in claim 8, wherein the cellulose derivative/synthetic rubber mixing ratio is from 70/30 to 95/5.

10. A magnetic recording medium as claimed in claim 1, wherein the polyisocyanate compound is present in an amount of from 5 to 60 parts by weight per 100 parts by weight of the combination of the cellulose derivative and synthetic rubber components.

11. A magnetic recording medium as claimed in claim 1, wherein the binder is present in an amount of 8 to 100 parts by weight per 100 parts by weight of the ferromagnetic powder.

12. A magnetic recording medium as claimed in claim 11, wherein the binder is present in an amount of 10 to 80 parts by weight per 100 parts by weight of the ferromagnetic powder.

13. A magnetic recording medium as claimed in claim 12, wherein the binder is present in an amount of 13 to 50 parts by weight per 100 parts by weight of the ferromagnetic powder.

14. A magnetic recording medium as claimed in claim 1, wherein the magnetic layer has a thickness of from 1 μm to 18 μm.

15. A magnetic recording medium as claimed in claim 14, wherein the magnetic recording medium has a thickness of about 30 μm or less.

* * * * *